July 21, 1942.  A. C. LINDGREN  2,290,243
OFFSET HARROW
Filed Feb. 28, 1940  4 Sheets-Sheet 1
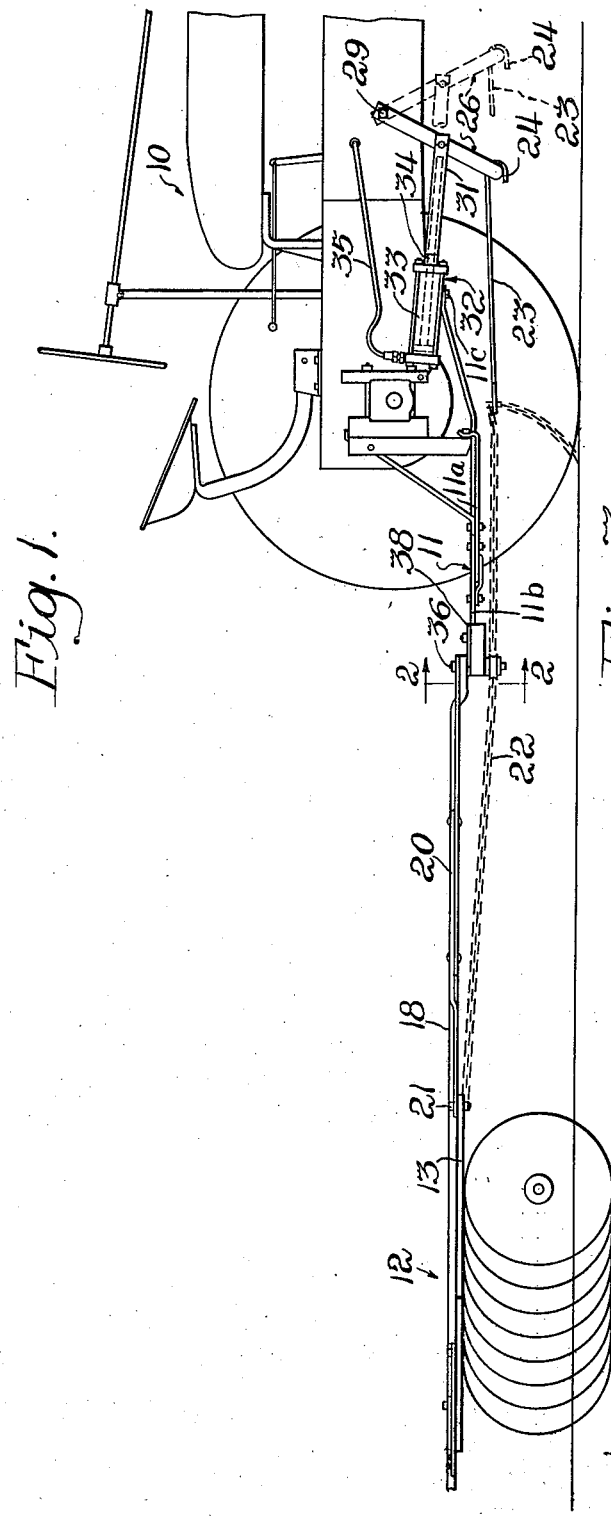
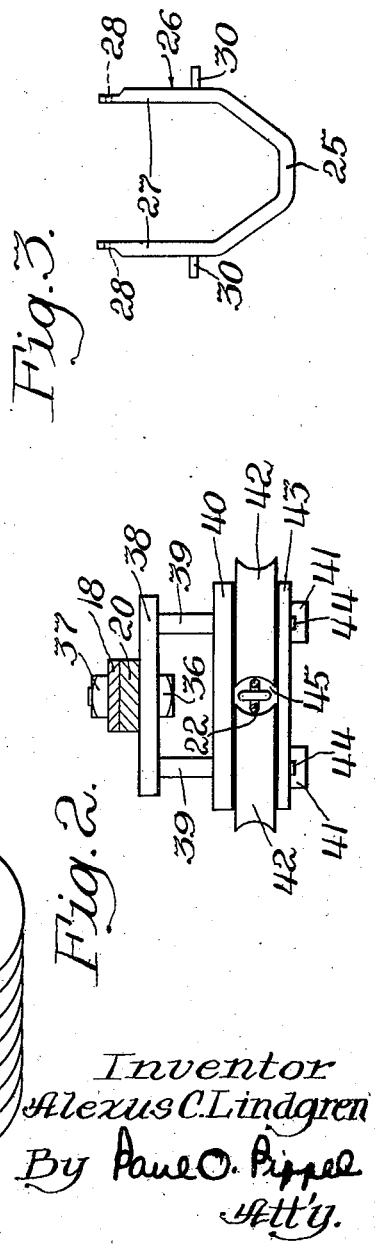
Inventor
Alexus C. Lindgren
By Paul O. Pippel
Att'y.

July 21, 1942.   A. C. LINDGREN   2,290,243
OFFSET HARROW
Filed Feb. 28, 1940   4 Sheets-Sheet 3

Inventor
Alexus C. Lindgren
By [signature]
Atty.

July 21, 1942.  A. C. LINDGREN  2,290,243
OFFSET HARROW
Filed Feb. 28, 1940  4 Sheets-Sheet 4
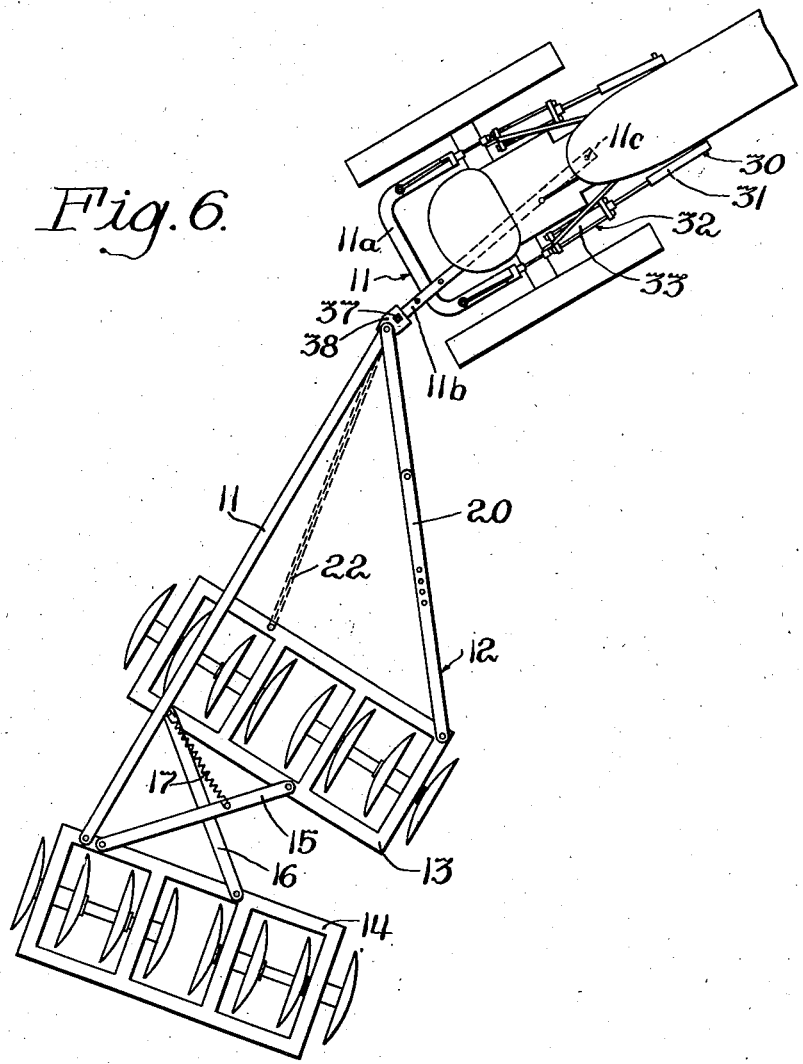
Inventor
Alexus C. Lindgren
By Paul O. Pippel
Atty.

Patented July 21, 1942

2,290,243

UNITED STATES PATENT OFFICE 2,290,243

OFFSET HARROW

Alexus C. Lindgren, Chicago, Ill., assignor to International Harvester Company, a corporation of New Jersey Application February 28, 1940, Serial No. 321,153

19 Claims. (Cl. 55—83)

This invention relates to an offset harrow. More specifically it relates to an offset harrow, the gangs of which are shifted by the power of the tractor which pulls the gangs.

In the application of Mott, Serial No. 321,154, filed simultaneously herewith, there is disclosed mechanism for adjusting an implement such as a harrow pulled behind the tractor by means of the power of the tractor. By the present application, it is the intention to claim the use of this particular mechanism for the shifting of the gangs of an offset harrow, and more broadly the shifting of the gangs of an offset harrow by the power of a tractor.

An object of the present invention is to provide an improved offset harrow.

Another object is to provide means for shifting the gangs of an offset harrow by the power of the tractor which pulls the harrow.

According to the present invention, an offset harrow is pivotally coupled at the rear of a tractor. The tractor carries a U-shaped member which embraces the body of the tractor and extends to a point considerably beneath the tractor. Means operated by the power of the tractor is connected to the U-shaped member, and the U-shaped member in turn is connected to the front gang of an offset harrow so that the power of the tractor may be used to change the angle of the gangs of the harrow.

In the drawings:

Figure 1 is a side view of portions of a tractor and a harrow attached to the tractor;

Figure 2 is a section taken along the line 2—2 of Figure 1;

Figure 3 is a detail view of a member forming part of the mechanism for angling the gangs of the harrow by the power of the tractor;

Figure 4:
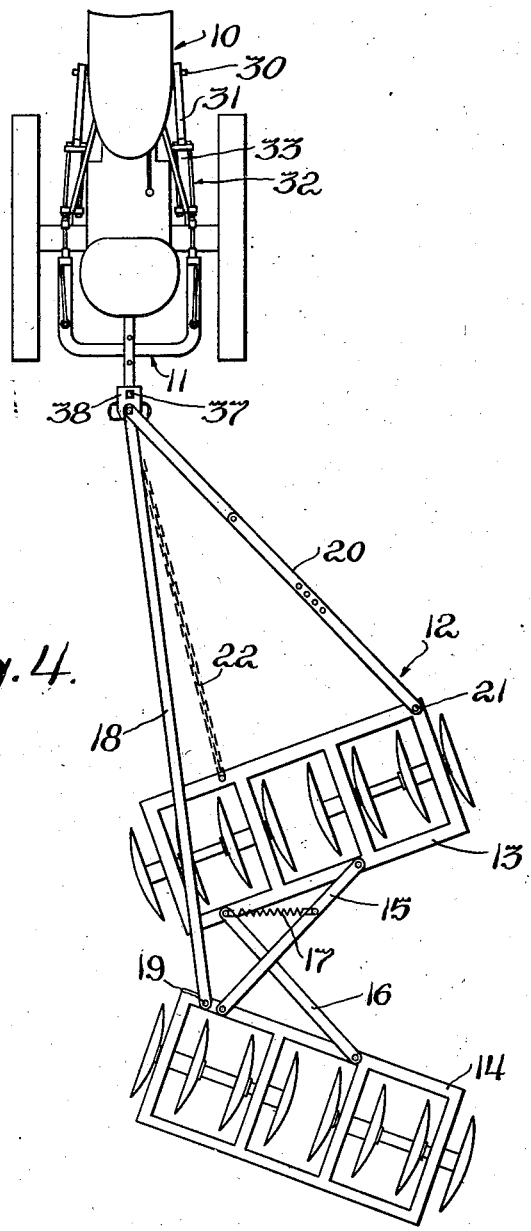
Figure 4 is the plan view showing the tractor and harrow in working position.

As shown in Figure 4, a tractor 10, of which only the rear portion is shown, has attached at its rear a draw-bar structure 11, composed of a rigid draw-bar 11a of U-shape and a swinging draw-bar 11b pivoted at its forward end at 11c to the underside of the tractor and slidably supported near its rear end on the rigid draw-bar 11a. An offset harrow 12 positioned at the rear of the tractor has a front gang 13 and a rear gang 14. Cross links 15 and 16 connect the gangs so that they may have relative angular movement. A spring 17 connects the link 15 and the gang 13, so that the gangs are urged into the operating position of Figure 3. The harrow 12 is connected to the draw-bar 11b by hitch means composed of a member 18 connected at a point 19 to the rear gang adjacent one end to one side of the links 15 and 16 and an adjustable member 20 connected to a point 21 on the front gang at the end on the other side of the links 15 and 16.

Figure 5:
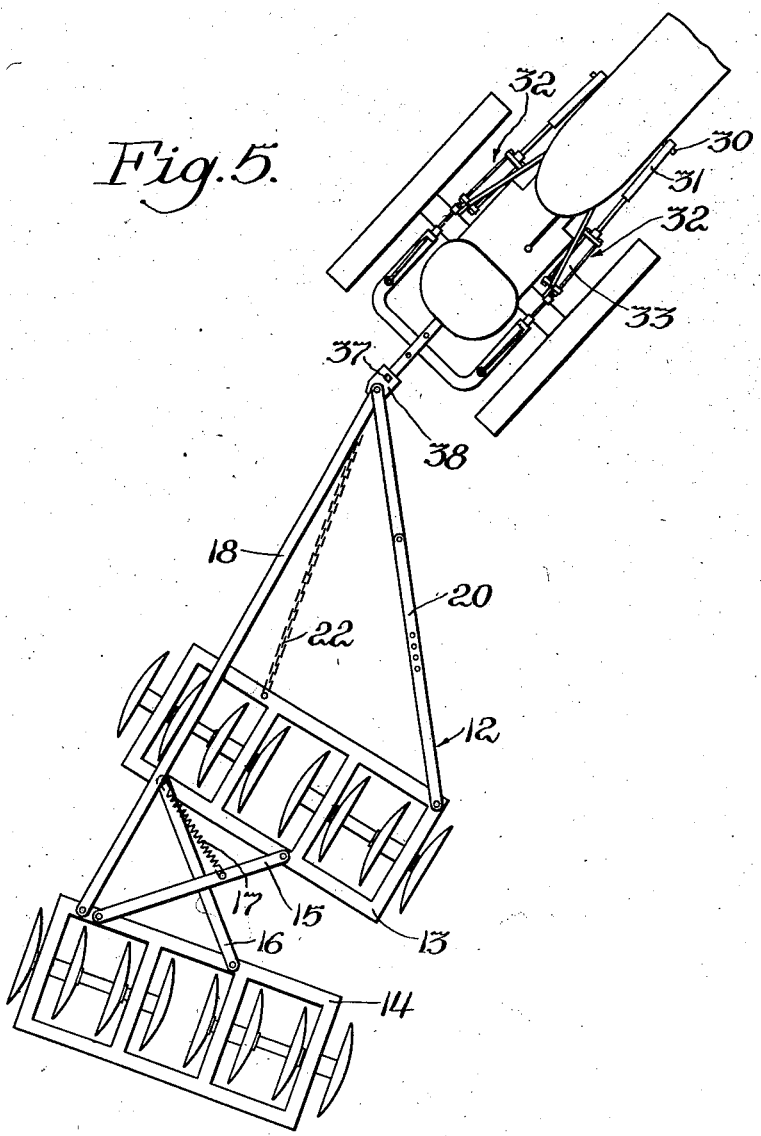
Figure 5 is a similar view showing the harrow in position for a right turn; and, Figure 6 is a view similar to Figure 5 but with a swinging draw-bar rather than a fixed draw-bar.

When it is desired to shift the gangs from the ordinary working position of Figure 4 to a parallel transport position, which permits turning to the right, the shifting is accomplished by power of the tractor acting through a chain 22 connected to the front gang 13. As seen in Figure 1, the chain 22 extends from the front gang 13 forwardly beneath the draw-bar structure 11 through an opening in a member 23. The member 23 has a hook portion 24 at one end which embraces a base portion 25 of a U-shaped member 26 having end portions 27 provided with openings 28 through which extend bolts 29 pivotally connecting the U-shaped member to the body of the tractor. The U-shaped member 26 has projections 30 extending from its sides to which are pivotally connected tubular members 31 forming part of power devices 32 such as shown in the patent to Lindgren, 2,156,570, May 2, 1939. Positioned at opposite sides of the tractor and as shown in the Lindgren patent, each power device comprises a cylinder 33 having a tubular extension 34 secured thereto and a piston, extending within the cylinder 33 and extension 34 and connected to the tubular member 31. Each power lift device is operated by fluid supplied by the power of the tractor through a conduit 35. When the power device is thus operated, it moves from the full line position of Figure 1 forward to the dotted line position. The resultant movement of the U-shaped member 26 and the chain 22 is transmitted to the front gang 13, so that the gangs are shifted either to a parallel transport position or to the angled position of Figure 5 or Figure 6 from which a right turn may be made. Figure 5 shows a turn to the right with the swinging draw-bar held against movement with respect to the tractor. Figure 6 shows a turn to the right with the swinging draw-bar permitted a pivotal movement with respect to the tractor.

The members 18 and 20, which form a hitch, are pivotally connected at their forward ends by a bolt 36 secured by means of a nut 37 to a plate 38 carried on the swinging draw-bar 11b.

Members 39 depend from a plate 38 and carry a plate 40 from which depend pins 41 on which pulleys 42 are rotatably mounted. A plate 43 holds the pulleys on the pins 41, and cotter pins 44 in turn hold the plate 43 on the pins. The pulleys 42 on the plates 40 and 43 enclose a space 45 through which the chain 22 passes. Thus when there is angular movement between the draw-bar 11b and the members 18 and 20 forming the hitch connecting the harrow and the tractor or between the draw-bar 11b and the tractor, the chain 22 does not become slack but is held tight and off the ground.

The various parts just described, including the U-shaped member 26, the member 23, and the chain 22, form a connection with a tractor attached implement rollers 42 which enclose the space for the chain 22, and are being claimed in the aforementioned Mott application. They form a part of the present invention only to the extent that they constitute means actuated by the power of a tractor for shifting the gangs of an offset harrow. It is the intention of the present application to claim broadly the shifting of the gangs of an offset harrow by the power of a tractor and more specifically the shifting of an offset harrow by the various parts described.

What is claimed is:

1. In combination, an offset harrow comprising two gangs connected for relative angular movement, a tractor, hitch means connecting the tractor and the harrow and including a first member connected to the forward gang and a second member connected to the rear gang, and means actuated by the power of the tractor for changing the relative angle between the gangs.

2. In combination, an offset harrow comprising two gangs connected for relative angular movement, a tractor, hitch means connecting the tractor and a point on one gang adjacent one end thereof and a point on the other gang adjacent the opposite end thereon, and means for changing the relative angle of the gangs, said means comprising a member mounted on the tractor and having a movement longitudinally of the tractor in response to the power thereof.

3. In combination, an offset harrow comprising two gangs connected for relative angular movement, a tractor, hitch means connecting the tractor and a point on one gang adjacent one end thereof and a point on the other gang adjacent the opposite end thereon, and means for changing the relative angle of the gangs, said means comprising a member mounted on the tractor and having a movement longitudinally of the tractor in response to the power thereof and a connection between the member and the front gang.

4. In combination, an offset harrow comprising two gangs connected for relative angular movement, a tractor, hitch means connecting the tractor and the harrow, and means mounted on the tractor and having a movement longitudinally of the tractor for changing the relative angle of the gangs.

5. In combination, an offset harrow comprising a pair of gangs connected for relative angular movement and for opening toward one side during normal operation, a tractor, hitch means connecting the tractor and the harrow for shifting the gangs from the angled position of normal operation to an angle position permitting turning toward the side toward which the gangs open during normal operation, said means comprising a member mounted on the tractor and shiftable longitudinally thereof in response to power of the tractor, and a connection between the member and the front gang.

6. In combination, an offset harrow comprising a pair of gangs connected for relative angular movement and for opening toward one side during normal operation, a tractor, hitch means connecting the tractor and the harrow, and means connecting the tractor and the harrow for shifting the gangs from the angled position of normal operation to an angled position permitting turning toward the side toward which the gangs open during normal operation, said means comprising a member pivotally mounted upon the tractor on an axis extending transversely of the tractor and being shiftable angularly in response to power of the tractor, and a connection between the member and the front gang.

7. In combination, an offset harrow comprising a pair of gangs connected for relative angular movement and for opening toward one side during normal operation, a tractor, hitch means connecting the tractor and the harrow, and means connecting the tractor and the harrow for shifting the gangs from the angled position of normal operation to an angled position permitting turning toward the side toward which the gangs open during normal operation, said means comprising means connected on opposite sides of the tractor and extending beneath the tractor and being shiftable longitudinally of the tractor in response to power of the tractor and a connection between the front gang and a point of the last-mentioned means beneath the tractor.

8. In combination, an offset harrow comprising a pair of gangs connected for relative angular movement and for opening toward one side during normal operation, a tractor, hitch means connecting the tractor and the harrow, and means connecting the tractor and the harrow for shifting the gangs from the angled position of normal operation to an angled position permitting turning toward the side toward which the gangs open during normal operation, said means comprising means pivotally connected on opposite sides of the tractor and extending beneath the tractor and being shiftable longitudinally of the tractor in response to power of the tractor and a connection between the front gang and a point of the last-mentioned means beneath the tractor, said connection including a flexible element supported at the point of connection of the hitch means with the tractor.

9. In combination, an offset harrow comprising a pair of gangs connected for relative angular movement and for opening toward one side during normal operation, a tractor having a draw-bar, a pair of rollers mounted on the drawbar and enclosing a space, hitch means connecting the harrow and a point on the drawbar adjacent the rollers, and means connecting the tractor and the harrow for shifting the gangs from the angled position of normal operation to an angled position permitting turning toward the side toward which the gangs are angled during normal operation, said means comprising a U-shaped member extending beneath the tractor and being connected at its ends on opposite sides of the tractor on an axis extending transversely of the tractor and being shiftable angularly in response to the power of the tractor, a connection between the front gang and the portion of the U-shaped member extending beneath the tractor, said connection including a flexible element passing through the space enclosed by the rollers mounted on the tractor draw-bar.

10. In combination, an offset harrow comprising a pair of gangs connected for relative angular movement and for opening toward one side during normal operation, a tractor having a draw-bar, a pair of rollers mounted on the draw-bar and enclosing a space, hitch means connecting the harrow and a point on the draw-bar adjacent the rollers, and means connecting the tractor and the harrow for shifting the gangs from the angled position of normal operation to an angled position permitting turning toward the side toward which the gangs are angled during normal operation, said means comprising a member shiftable longitudinally of the tractor in response to power of the tractor, and a connection between the member and the front gang, said connection including a flexible element passing through the space enclosed by the rollers mounted on the tractor draw-bar.

11. In combination, an offset harrow comprising a pair of gangs connected for relative angular movement and for opening toward one side during normal operation, a tractor, hitch means connecting the harrow and the tractor, a pair of rollers mounted adjacent the connection of the hitch means and the tractor and enclosing a space, and means connecting the tractor and the harrow for shifting the gangs from the angled position of normal operation to an angled position permitting turning toward the side toward which the gangs are angled during normal operation, said means comprising a member shiftable longitudinally of the tractor in response to power of the tractor, and a connection between the member and the front gang, said connection including a flexible element passing through the space enclosed by the rollers.

12. In combination, an offset harrow comprising a pair of gangs connected for relative angular movement and for opening toward one side during normal operation, resilient means tending to urge the gangs into the relative angular position of normal operation, a tractor, hitch means connecting the tractor and the harrow, and means connecting the tractor and the harrow for shifting the gangs from the angled position of normal operation to an angled position permitting turning toward the side toward which the gangs open during normal operation, said means comprising a member mounted on the tractor and shiftable longitudinally thereof in response to power of the tractor, and a connection between the member and the front gang, said connection including a flexible element supported at a point adjacent the connection of the tractor and the hitch means.

13. In combination, an offset harrow comprising a pair of gangs connected for relative angular movement and for opening toward one side during normal operation, resilient means tending to urge the gangs into the relative angular position of normal operation, a tractor, hitch means connecting the tractor and the harrow, and means connecting the tractor and the harrow for shifting the gangs from the angled position of normal operation to an angled position permitting turning toward the side toward which the gangs open during normal operation, said means comprising a member mounted on the tractor on an axis extending transversely of the tractor and shiftable angularly in response to power of the tractor, and a connection between the member and the front gang, said connection including a flexible element supported at a point adjacent the connection of the tractor and the hitch means.

14. In combination, an offset harrow comprising two gangs connected for relative angular movement, a tractor, hitch means connecting the harrow and the tractor, and means actuated by the power of the tractor for changing the angle between the gangs and including a member mounted on the tractor and having a movement longitudinally thereof.

15. In combination, an offset harrow comprising two gangs connected for relative angular movement, a tractor, hitch means connecting the harrow and the tractor, and means actuated by the power of the tractor for changing the angle between the gangs and including a member pivotally mounted on an axis extending transversely of the tractor.

16. In combination, an offset harrow comprising two gangs connected for relative angular movement, a tractor, hitch means connecting the harrow and the tractor, and means actuated by the power of the tractor for changing the angle between the gangs and including a member pivotally mounted on an axis extending transversely of the tractor and a connection between the member and one gang.

17. In combination, an offset harrow comprising two gangs connected for relative angular movement, a tractor, hitch means connecting the harrow and the tractor, and means actuated by the power of the tractor for changing the angle between the gangs and including a member pivotally mounted on an axis extending transversely of the tractor and a connection between the member and the forward gang.

18. In combination, an offset harrow comprising two gangs connected for relative angular movement, a tractor, hitch means connecting the harrow and the tractor, and means actuated by the power of the tractor for changing the angle between the gangs and including a member mounted on the tractor and having a movement longitudinally thereof and a connection between the member and one gang.

19. In combination, an offset harrow comprising two gangs connected for relative angular movement, a tractor, hitch means connecting the harrow and the tractor, and means actuated by the power of the tractor for changing the angle between the gangs and including a member mounted on the tractor and having a movement longitudinally thereof and a connection between the member and the forward gang.

ALEXUS C. LINDGREN.